(12) United States Patent
Elving et al.

(10) Patent No.: US 9,004,614 B1
(45) Date of Patent: Apr. 14, 2015

(54) DUAL PRESSURE CONTROL FOR A ROTOR BRAKE ACTUATOR FOR VERTICAL LIFT AIRCRAFT

(71) Applicant: Bell Helicopter Textron Inc., Fort Worth, TX (US)

(72) Inventors: Carl T. Elving, Southlake, TX (US); James E. Sobel, Haslet, TX (US); Michael Pujol, Dallas, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 14 days.

(21) Appl. No.: 14/036,760

(22) Filed: Sep. 25, 2013

(51) Int. Cl.
*B60T 13/22* (2006.01)
*B60T 15/02* (2006.01)

(52) U.S. Cl.
CPC ...................................... *B60T 15/02* (2013.01)

(58) Field of Classification Search
USPC ........ 188/71.1, 72.1, 72.3, 72.4, 355; 303/71, 303/115.4, 119.1; 415/123; 416/32; 60/591
See application file for complete search history.

(56) References Cited

U.S. PATENT DOCUMENTS

| | | | |
|---|---|---|---|
| 3,228,195 A | 1/1966 | Brent et al. | |
| 5,462,137 A | 10/1995 | Aubry et al. | |
| 6,322,164 B1 * | 11/2001 | Sakamoto et al. | 303/115.4 |
| 2008/0277213 A1 * | 11/2008 | Doleschel et al. | 188/72.6 |

OTHER PUBLICATIONS

Search Report issued in European Application No. 13194422.5 on Sep. 25, 2014; 3 pages.
Communication Pursuant to Article 94(3) EPC issued in European Application No. 13194422.5 on Oct. 13, 2014; 4 pages.

* cited by examiner

*Primary Examiner* — Vishal Sahni
(74) *Attorney, Agent, or Firm* — Fish & Richardson P.C.

(57) ABSTRACT

In some aspects, a master cylinder assembly for vertical lift aircraft is configured to move pressurized fluid through a conduit in response to applied movement of an input lever. A low pressure relief valve can be connected to a first conduit to limit pressure to a low level. An isolation valve can be connected to the first conduit and configured to isolate the low pressure relief valve from the conduit when engaged. A high pressure relief valve can be connected to a second fluid conduit to limit pressure to a high level. In some aspects, a rotor brake actuator is fluidly connected to the first conduit and the second conduit and configured to engage a rotor brake in response to hydraulic fluid pressure.

19 Claims, 3 Drawing Sheets

DUAL PRESSURE CONTROL FOR A ROTOR BRAKE ACTUATOR FOR VERTICAL LIFT AIRCRAFT

TECHNICAL FIELD

The following description relates to control of a rotor brake actuator system for vertical lift aircraft.

BACKGROUND

The rotor brake of a vertical lift aircraft such as a helicopter can be applied with hydraulic actuators that use multiple hydraulic pressure settings for different operational situations. In some cases, a first pressure setting is a higher pressure than a second pressure setting. For example, a lower pressure (e.g. 220 psi) can be applied to the rotor brake to slowly stop the rotor after landing. Likewise, a higher pressure (e.g. 800 psi) can be applied to the rotor brake to hold the rotor from rotation during engine start-up.

SUMMARY

This description relates to a dual pressure brake actuator for vertical lift aircraft. In some implementations, a rotor blade rotation control master cylinder assembly for vertical lift aircraft includes a master cylinder, a rotor brake actuator, a low pressure relief valve, a high pressure relief valve, and an isolation valve. The master cylinder is configured to be activated by movement of a rotor blade rotation control handle of a vertical lift aircraft to move pressurized hydraulic fluid through one or more conduits. The rotor brake actuator is connected to the master cylinder and configured to engage a rotor brake of the vertical lift aircraft in response to receiving hydraulic fluid at a hydraulic fluid pressure from the master cylinder. The low pressure relief valve fluidly is connected in parallel to the master cylinder and the rotor brake actuator and configured to transmit pressurized hydraulic fluid away from the rotor brake actuator in response to the hydraulic fluid pressure exceeding a first pressure threshold of the low pressure relief valve. The high pressure relief valve is connected in parallel to the master cylinder, the rotor brake actuator and the low pressure relief valve and configured to transmit pressurized hydraulic fluid away from the rotor brake actuator in response to the hydraulic fluid pressure exceeding a second pressure threshold of the high pressure relief valve. The second pressure threshold is higher than the first pressure threshold, and the low pressure relief valve can be isolated from the high pressure relief valve. The isolation valve is connected in series to the master cylinder and the low pressure relief valve. The master cylinder is configured to push the hydraulic fluid at a first pressure to the rotor brake actuator in response to the isolation valve being open and to push the hydraulic fluid at a second pressure that is lower than the first pressure in response to the isolation valve being closed.

DESCRIPTION OF DRAWINGS

Like reference symbols in the various drawings indicate like elements.

DETAILED DESCRIPTION

The rotor brake of a vertical lift aircraft such as a helicopter can be applied with hydraulic actuators that use multiple hydraulic pressure settings for different operational situations. For example, a first pressure can be applied to the rotor brake to slowly stop the rotor, such as an engine shutdown after landing. Likewise, a second pressure can be applied to the rotor brake to hold the rotor from rotation, e.g., during engine start-up. In some implementations, the first pressure used to slowly stop the rotor can be lower than the second pressure to hold the rotor from rotation. In some typical implementations of a rotor brake actuator, the first pressure setting can be provided by a manual cylinder, and the second pressure setting can be provided by an additional separate motor-driven pump. The addition of a separate motor-driven pump can add significant weight and cost to the rotor brake assembly. In some typical implementations, the aircraft hydraulic system pressure is used to provide pressure to the rotor brake to slow, stop, or hold the rotor. Any additional components coupled to the aircraft hydraulic system can be sources of failure and stress on the system. In some typical implementations, a pressure setting is achieved with multiple strokes of a handle by a crewmember.

The example rotor blade rotation control assembly (the "rotor brake control circuit assembly") herein can provide multiple pressure settings to a rotor brake without the use of aircraft hydraulic system pressure or an additional separate motor-driven pump. The example rotor brake control circuit assembly also can provide adequate pressure from a single stroke of the rotor blade rotation control handle (the "rotor brake handle"). In some instances, the example rotor brake control circuit assembly described herein can provide multiple pressure settings at a reduced weight and cost over other assemblies. Moreover, the example rotor brake control circuit assembly can provide multiple pressure settings using only a single master cylinder. The example rotor brake control circuit assembly can allow the pilot to precisely control the position of the rotor blade, e.g., to position the rotor blade and stop it at a specific position. In some implementations, the rotor brake can be maintained for several hours with little to no loss in pressure. For example, the rotor brake can act as a parking brake for overnight storage. This allows operators to not have to secure the blades manually when parking for short periods of time.

Figure 1:
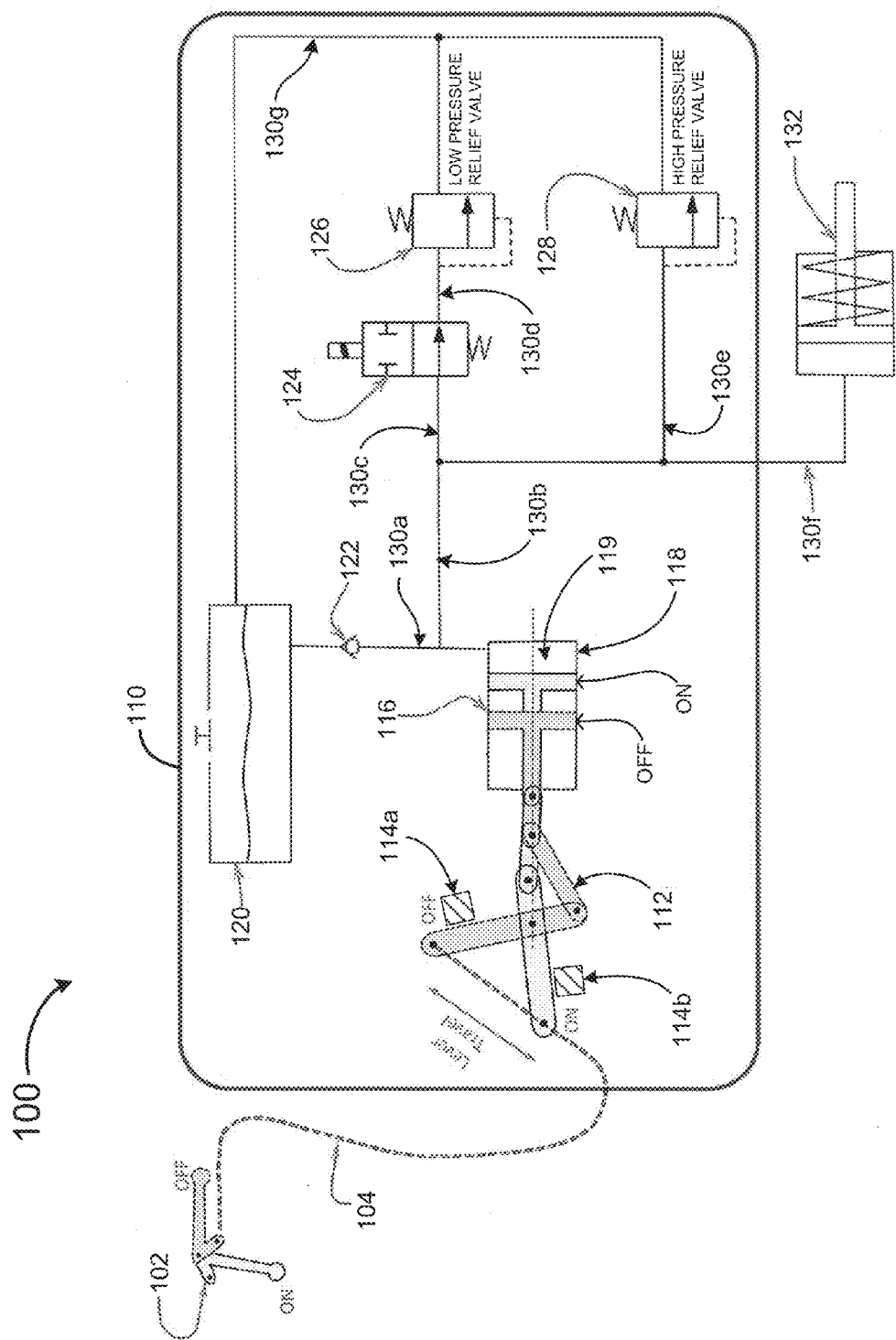
FIG. 1 is a schematic diagram of an example hydraulic control circuit in an example rotor brake assembly.

FIG. 1 is a schematic of an example rotor brake actuator control circuit system 100. The example rotor brake actuator control circuit system 100 includes a handle 102, a linkage 104, a master cylinder assembly 110, and plumbing conduit tube 130*f*. The handle 102 is connected to the linkage 104, which is connected to the master cylinder assembly 110 via input lever 112. The input lever 112 is coupled to stops 114*a*, 114*b* and a piston 116. The piston 116 resides inside a master cylinder 118 and forms a main chamber 119 within the master cylinder 118. The master cylinder assembly 110 also includes a reservoir 120 fluidly connected to the master cylinder 118 through a check valve 122. The master cylinder assembly 110 includes an isolation valve 124, a low pressure relief valve 126, and a high pressure relief valve 128. The rotor brake actuator control circuit system 100 also includes conduits 130*a*, 130*b*, 130*c*, 130*d*, 130*e*, 130*g* and a rotor brake actuator 132. The master cylinder 118, the reservoir 120, the check valve 122, the isolation valve 124, the low pressure relief valve 126, the high pressure relief valve 128, and the rotor brake actuator 132 are all fluidly connected via conduits 130*a*, 130*b*, 130*c*, 130*d*, 130*e*, 130*f*, 130*g*.

The low pressure relief valve 126, the high pressure relief valve 128, and the rotor brake actuator 132 are fluidly connected in parallel to master cylinder 118 and conduits 130a and 130b via conduits 130c and 130d, 130e, and 130f, respectively. In some cases, the conduits 130a, 130b, 130c, 130d, 130e, 130f, and 130g are ports between components. In some cases, the conduits 130a, 130b, 130c, 130d, 130e, 130f, and 130g can include tubing or piping, or the conduits can be coupled through other components. The rotor brake actuator system 100 can include additional or different features, and the components can be configured as shown in FIG. 1, or they may be configured in another manner. For example, the components of the master cylinder assembly 110 can be incorporated into a single unit or separated into multiple units.

The handle 102 can be a lever that can be positioned between two extreme positions, "ON" and "OFF." During operation, the handle 102 can be positioned at either extreme position or at any position in between. In some implementations, the handle 102 is a manually-operated lever that can be pivoted at one end. The handle 102 can be composed of two or more components that together provide the mechanical action. The handle 102 can be configured to operate with a load spread over the actuation distance between ON and OFF.

The handle 102 is coupled to a linkage 104. The linkage 104 can be a mechanical linkage that is configured to transfer the translation of handle 102 into the master cylinder assembly 110. The linkage 104 can include multiple links, bellcranks, cables, hydraulic systems or other components. For example, the linkage 104 can include a cable coupling the handle 102 to the input lever 112. In this case, translating the handle 102 will translate the input lever 112 through the linkage 104. Input lever 112 is a mechanism coupled to linkage 104 and piston 116. The piston 116 resides within master cylinder 118. The input lever 112 can include one or more levers, linkages, or components. Operation of handle 102 can actuate input lever 112 via linkage 104. As such, the actuation of input lever 112 can be proportional to the distance the handle 102 is operated. Input lever 112 is coupled to piston 116 such that piston 116 is translated within cylinder 118 when input lever 112 is actuated. The travel distance of input lever 112 is limited by stops 114a, 114b. The stops 114a, 114b are rigid and fixed members that prevent the input lever 112 from traveling beyond extreme positions corresponding to ON and OFF. For example, the stops 114a and 114b are positioned at positions that correspond to the ON and OFF positions of the handle 102. When the handle 102 is in the ON position, the input lever 112 impinges against stop 114a and when the handle 102 is in the OFF position, the input lever 112 impinges against the stop 114b.

The main chamber 119 of the master cylinder 118 is fluidly connected to reservoir 120 via conduit 130a. Reservoir 120 can contain a fluid such as a hydraulic fluid. Check valve 122 is located in the conduit 130a between the main chamber 119 and the reservoir 120. Check valve 122 allows fluid to flow from the reservoir 120 into the main chamber 119 through conduit 130a but prevents fluid from flowing in reverse from the main chamber 119 into the reservoir 120 through the same conduit 130a.

Fluid can be flowed from the reservoir 120 into the master cylinder 118 during the stroke of the piston 116. For example, when the handle 102 is operated from the ON position to the OFF position, the piston 116 retracts and pulls fluid from the reservoir 120 into the main chamber 119. When the handle 102 is operated from the OFF position into the ON position, the piston 116 extends and ports fluid under pressure from the main chamber 119 into the conduit 130a.

The conduit 130a is fluidly connected to conduits 130b, 130c, 130d, 130e, and 130f. Low pressure relief valve 126 is connected to conduits 130c and 130d, and high pressure relief valve 128 is connected to conduit 130e. If the fluid pressure in the conduits 130c and 130d exceeds some first specified value with the isolation valve 124 open, the low pressure relief valve 126 will open and excess fluid will be ported to reservoir 120 via conduit 130g until the fluid pressure falls below the specified value. If the fluid pressure in the conduit 130e exceeds some second specified value with the isolation valve 124 closed, the high pressure relief valve 128 will open and excess fluid will be ported to reservoir 120 via conduit 130g until the fluid pressure falls below the specified value. In this example, the first specified pressure value associated with the low pressure relief valve 126 is lower than the second specified pressure value associated with the high pressure relief valve 128.

Rotor brake actuator 132 is connected to conduit 130d. The rotor brake actuator 132 can impart a braking force onto the rotor of a vertical lift aircraft (not shown). The braking force could be provided by a mechanism such as calipers that are actuated by the rotor brake actuator 132. Thus, the fluid in conduits 130a and 130b is also ported under pressure into conduit 130c during extension of the piston 116. The isolation valve 124 is a two-position valve that operates to open and close the conduit 130d. The isolation valve 124 can include one or more solenoids or other mechanical components. The isolation valve 124 can be engaged or disengaged after receiving a mechanical or electronic signal. The isolation valve 124 can be controlled by the aircraft's avionics system or a pilot-operated switch. For example, isolation valve 124 can be engaged after receiving an electronic signal from the aircraft's avionics system. If the isolation valve 124 is open, the fluid can be ported via conduit 130c through isolation valve 124 and into low pressure relief valve 126 via conduit 130d. When the isolation valve 124 is closed, then the low pressure relief valve 126 is no longer fluidly connected to conduit 130b.

As the fluid flows into the rotor brake actuator 132 with continued movement of the handle 102 from the OFF position to the ON position, the pressure on the rotor brake actuator 132 increases. Returning the handle 102 to the OFF position causes the fluid to withdraw from the rotor brake actuator 132, resulting in a pressure drop in the rotor brake actuator 132. The rotor brake actuator 132 imparts the braking force proportionally to the pressure of the fluid in conduit 130d.

When isolation valve 124 is closed, the pressure of the fluid in the conduits 130a, 130b, 130c, 130e, and 130f is controlled (e.g., limited) by the high pressure relief valve 128, and the maximum braking force imparted by the rotor brake actuator 132 is controlled by the high pressure relief valve 128. When isolation valve 124 is open, the pressure of the fluid in the conduits 130a, 130b, 130c, 130d, 130e, and 130f is controlled by both the low pressure relief valve 126 and the high pressure relief valve 128. Since the low pressure relief valve 126 has a lower pressure threshold value than the high pressure relief valve 128, then the maximum braking force imparted by the rotor brake actuator 132 is controlled by the pressure threshold value of the low pressure relief valve 126. Thus, if the isolation valve 124 is open, the maximum braking force imparted by the rotor brake actuator 132 is lower than the maximum force imparted when the isolation valve 124 is closed.

Figure 2:
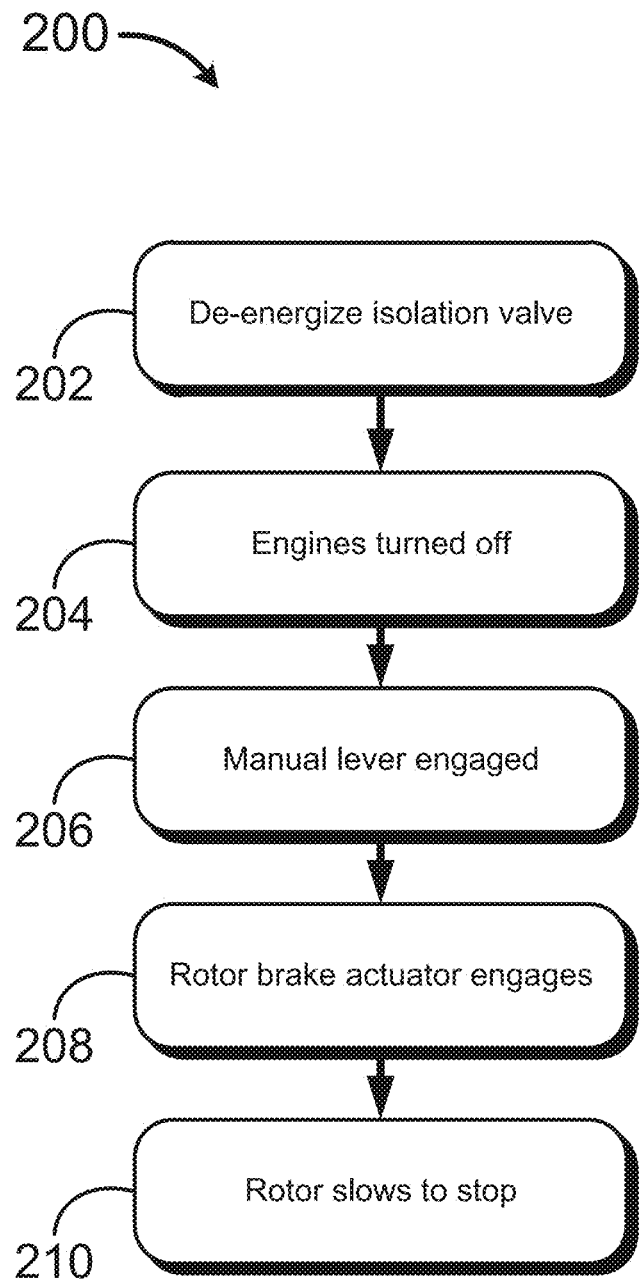
FIG. 2 is a flowchart diagram of an example rotor braking process.

FIG. 2 is a flow chart diagram of example rotor braking process 200. The example rotor braking process 200 is a process to slow or stop the rotors of a vertical lift aircraft. The example rotor braking process 200 can be based on (e.g., implemented by) the example rotor brake actuator control circuit system 100 described in FIG. 1. In some implementations, the rotor braking process 200 corresponds to the configuration in FIG. 1 in which the isolation valve is open. In some instances, an interlock prevents the rotor brake system from being operated when the engines are on. The interlock system can be controlled by the aircraft's avionics system, and include sensors or signals coupled to aircraft components.

At 202, the isolation valve is de-energized. The isolation valve can be a valve such as isolation valve 124 in FIG. 1. The isolation valve can be de-energized manually by the pilot. The isolation valve can also be de-energized automatically, such as in response to a signal from the aircraft's avionics system.

At 204, the engines of the vertical lift aircraft are turned off. For example, the engines can be turned off after the aircraft has landed. Without engine power, the rotors begin to slow.

At 206, the manual lever can be engaged. The manual lever can be a handle or mechanism such as handle 102 shown in FIG. 1. The manual lever can be translated from an OFF position to an ON position or any position in between. At the OFF position, no braking force is applied to the rotor. At ON position, the maximum braking force is applied to the rotor. An intermediate position between OFF and ON can provide an intermediate amount of braking force that can be proportional to that intermediate position.

In some instances, the manual lever can be configured to produce maximum rotor braking after a single translation from OFF to ON. The manual lever can be configured to distribute manual pilot input work required throughout the full travel of the handle to activate the master cylinder to minimize the maximum handle load at all handle positions. This can keep pilot load to a minimal, manageable level. This can also allow a design to be utilized that does not require pressure from the aircraft hydraulic system or require an electric motor driven pump.

At 208, the operation of the manual lever causes the rotor brake actuator to engage, exerting a braking force on the rotor. For example, the rotor brake can include calipers coupled to the tail rotor drive shaft or other parts within the drive system. The rotor brake actuator can be controlled indirectly via the rotor brake control circuit assembly by the movement of the manual lever.

At 210, the braking force slows the rotor to a stop. In some implementations, the handle can be moved towards ON or OFF to allow the master cylinder to increase or decrease rotor brake pressure. This can allow the pilot to position the rotor blade and stop it at a specific position. In some implementations, the rotor brake actuator pressure can be maintained for several hours with little to no loss in pressure. For example, the rotor brake can act as a parking brake for overnight storage.

Figure 3:
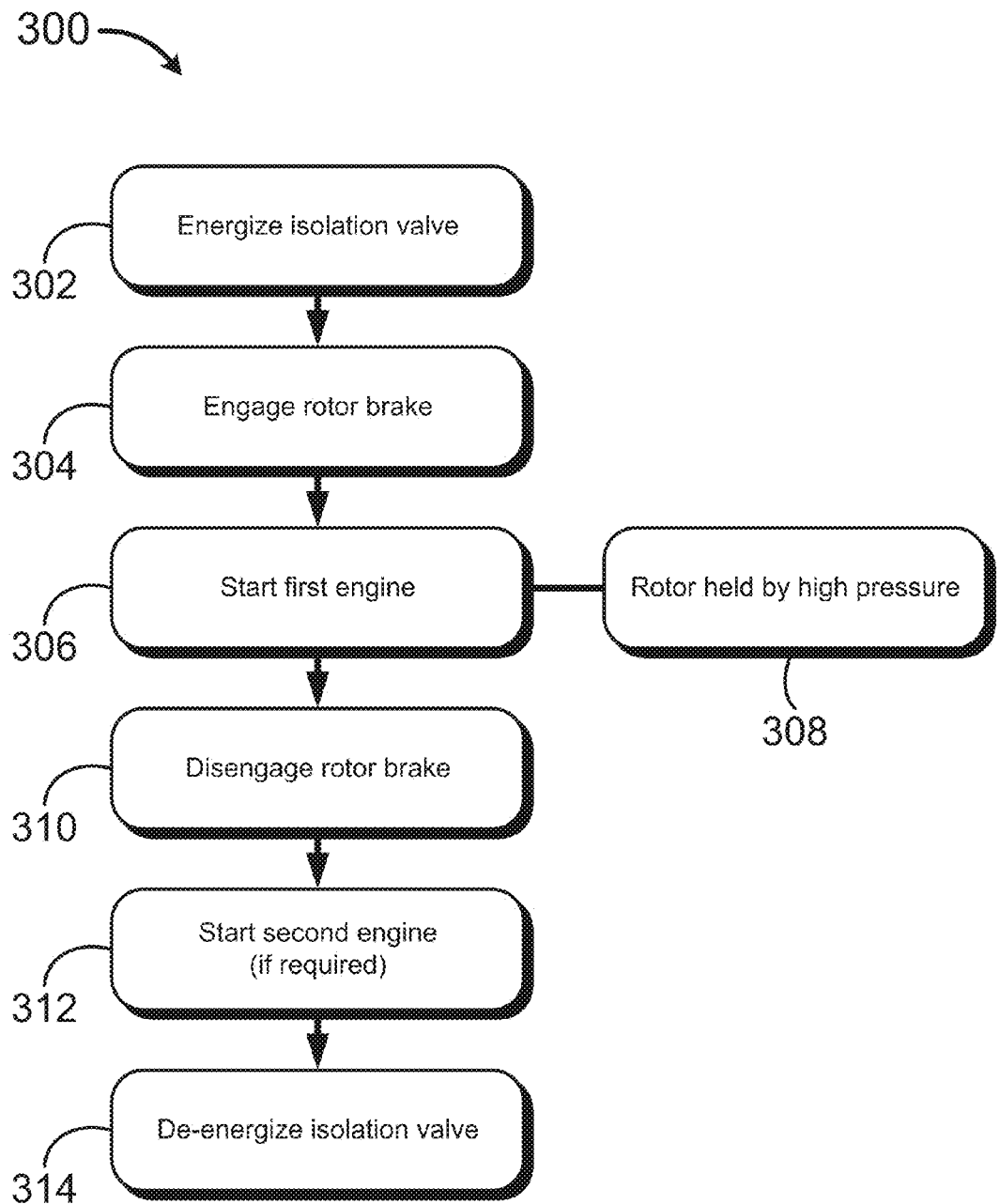
FIG. 3 is a flowchart diagram of an example rotor holding process.

FIG. 3 is a flow chart diagram of example rotor braking process 300. The example rotor braking process 300 is a process to hold the rotors of a vertical lift aircraft upon initial engine start-up. The example rotor braking process 300 can be based on the example rotor brake actuator control circuit system 100 described in FIG. 1.

The example rotor braking process 300 corresponds to a vertical lift aircraft which has its engines and systems initially turned off, and the rotor brake disengaged. In some implementations, the rotor brake is still engaged from a previous parking configuration. The pilot begins the engine startup procedure by turning on the power. At 302, the isolation valve is energized either manually via an electrical switch or automatically via the avionics system. When the isolation valve is energized, it closes and thus isolates the low-pressure relief valve from the rotor brake control circuit assembly.

At 304, the pilot sets the rotor brake. In the example rotor brake control circuit assembly shown in FIG. 1, the handle 102 is set to the fully ON position. The low-pressure relief valve is isolated from the rotor brake control circuit assembly by the isolation valve, so the pressure in the rotor brake control circuit assembly is limited by the high pressure relief valve. Thus, the rotor brake is applied at a relatively high pressure.

At 306, the pilot starts the first engine of the aircraft. The rotors are held from turning by the rotor brake (at 308).

At 310, the pilot disengages the rotor brake by setting the handle to the fully OFF position. Once the brake is disengaged, the rotors are able to turn under the power of the first engine. After the rotors are free to turn, the pilot also can activate a second aircraft engine (at 312).

At 314, the isolation valve is disengaged, either manually via an electrical switch or automatically via the avionics system.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of examples have been described. Nevertheless, it will be understood that various modifications can be made. Accordingly, other implementations are within the scope of the following claims.

The invention claimed is:

1. A rotor blade rotation control master cylinder assembly for vertical lift aircraft, the assembly comprising:
   a master cylinder configured to be activated by movement of a rotor blade rotation control handle of a vertical lift aircraft to move pressurized hydraulic fluid through one or more conduits;
   a rotor brake actuator connected to the master cylinder and configured to engage a rotor brake of the vertical lift aircraft in response to receiving hydraulic fluid at a hydraulic fluid pressure from the master cylinder;
   a low pressure relief valve fluidly connected in parallel to the master cylinder and the rotor brake actuator, and configured to transmit pressurized hydraulic fluid away from the rotor brake actuator in response to the hydraulic fluid pressure exceeding a first pressure threshold of the low pressure relief valve;
   a high pressure relief valve connected in parallel to the master cylinder, the rotor brake actuator and the low pressure relief valve, and configured to transmit pressurized hydraulic fluid away from the rotor brake actuator in response to the hydraulic fluid pressure exceeding a second pressure threshold of the high pressure relief valve, the second pressure threshold higher than the first pressure threshold, wherein the low pressure relief valve can be isolated from the high pressure relief valve; and
   an isolation valve connected in series to the master cylinder and the low pressure relief valve, the master cylinder configured to push the hydraulic fluid at a first pressure to the rotor brake actuator in response to the isolation valve being open and to push the hydraulic fluid at a second pressure that is lower than the first pressure in response to the isolation valve being closed.

2. The rotor blade rotation control master cylinder assembly of claim 1, further comprising one or more stops to prevent an input lever from translating beyond a certain distance.

3. The rotor blade rotation control master cylinder assembly of claim 1, wherein the hydraulic fluid in the rotor blade rotation control master cylinder assembly can provide a pressurized volume of fluid to engage the rotor brake in response to a single translation of the rotor blade rotation control handle.

4. The rotor blade rotation control master cylinder assembly of claim 1, wherein the isolation valve includes a solenoid.

5. The rotor blade rotation control master cylinder assembly of claim 1, wherein the rotor brake actuator is configured to slow the rotor of the vertical lift aircraft at or below the first pressure threshold.

6. The rotor brake actuator of claim 5, wherein the rotor brake actuator is configured to slow the rotor of the vertical lift aircraft when the vertical lift aircraft is stopped.

7. The rotor blade rotation control master cylinder assembly of claim 1, wherein the rotor brake actuator is configured to hold the rotor of the vertical lift aircraft at or below the second pressure threshold.

8. The rotor brake actuator of claim 7, wherein the rotor brake actuator is configured to hold the rotor of the vertical lift aircraft when the vertical lift aircraft is starting.

9. The rotor blade rotation control master cylinder assembly of claim 1, wherein the rotor blade rotation control master cylinder assembly is configured to maintain sufficient pressure to prevent rotor motion for a period of time after stopping.

10. A rotor blade rotation control master cylinder assembly for vertical lift aircraft, the assembly comprising:
a master cylinder configured to be activated by a pressure of a rotor blade rotation control handle of a vertical lift aircraft to move pressurized hydraulic fluid through one or more conduits, and configured to move pressurized fluid into a rotor brake actuator;
a low pressure relief valve fluidly connected to the master and configured to transmit hydraulic fluid in response to the hydraulic fluid pressure exceeding a first pressure threshold of the low pressure relief valve;
a high pressure relief valve connected in parallel to the master cylinder and the low pressure relief valve, and configured to transmit hydraulic fluid in response to the hydraulic fluid pressure exceeding a second pressure threshold of the high pressure relief valve, the second pressure threshold higher than the first pressure threshold; and
an isolation valve connected in series to the master cylinder and the low pressure relief valve configured to allow the master cylinder to move pressurized hydraulic fluid at a first pressure in response to the isolation valve being open and to move the pressurized hydraulic fluid at a second pressure that is lower than the first pressure in response to the isolation valve being closed.

11. The rotor blade rotation control master cylinder assembly of claim 10, further comprising one or more stops to prevent an input lever from translating beyond a certain distance.

12. The rotor blade rotation control master cylinder assembly of claim 10, wherein the hydraulic fluid in the rotor blade rotation control master cylinder assembly can be pressurized to engage a rotor brake in response to a single translation of the rotor blade rotation control handle.

13. The rotor blade rotation control master cylinder assembly of claim 10, wherein the isolation valve includes a solenoid.

14. The rotor blade rotation control master cylinder assembly of claim 10, wherein the volume of pressurized hydraulic fluid actuates a rotor brake actuator.

15. The rotor blade rotation control master cylinder assembly of claim 14, wherein the rotor brake actuator is configured to slow the rotor of the vertical lift aircraft at or below the first pressure threshold.

16. The rotor brake actuator of claim 15, wherein the rotor brake actuator is configured to slow the rotor of the vertical lift aircraft when the vertical lift aircraft is stopped.

17. The rotor blade rotation control master cylinder assembly of claim 14, wherein the rotor brake actuator is configured to hold the rotor of the vertical lift aircraft at or below the second pressure threshold.

18. The rotor brake actuator of claim 17, wherein the rotor brake actuator is configured to hold the rotor of the vertical lift aircraft when the vertical lift aircraft is starting.

19. The rotor blade rotation control master cylinder assembly of claim 10, wherein the rotor blade rotation control master cylinder assembly is configured to maintain sufficient pressure to prevent rotor motion for a period of time after stopping.

* * * * *